United States Patent [19]
Johnson

[11] 3,927,745
[45] Dec. 23, 1975

[54] TRACTION SYSTEM

[75] Inventor: Aaron C. Johnson, Ovid, Mich.

[73] Assignees: Alfred E. Weekley, Birch Run; John Hatfield, Davison; Floyd Jones, Flint, all of Mich. ; part interest to each

[22] Filed: May 23, 1974

[21] Appl. No.: 472,599

[52] U.S. Cl.............. 192/49; 192/17 R; 192/41 R; 192/43; 192/74
[51] Int. Cl.² .................. F16D 41/00; F16D 13/18
[58] Field of Search ........ 192/41 R, 43, 49, 50, 74, 192/17 R, 17 A

[56] References Cited
UNITED STATES PATENTS

| | | | |
|---|---|---|---|
| 836,035 | 11/1906 | Hendricks | 192/50 |
| 1,381,876 | 6/1921 | Hayward | 192/43 |
| 1,499,336 | 7/1924 | Blackburn | 192/50 |

FOREIGN PATENTS OR APPLICATIONS

| | | | |
|---|---|---|---|
| 458,714 | 8/1913 | France | 192/43 |

Primary Examiner—Allan D. Herrmann
Attorney, Agent, or Firm—Basile and Weintraub

[57] ABSTRACT

A traction system for wheeled vehicles includes a straight line axle having an eccentrically mounted fulcrum pinned thereonto. Depending on the direction of rotation of the wheel, the fulcrum engages one of a pair of free-falling shoes to provide positive driving to the wheel. The present invention can be deployed in systems using pneumatic and hydraulic braking systems.

9 Claims, 3 Drawing Figures

TRACTION SYSTEM

BACKGROUND OF THE INVENTION

1. Field of the Invention

The present invention relates to traction systems for wheeled vehicles. More particularly, the present invention relates to a positive traction system for wheeled vehicles. Even more particularly, the present invention pertains to positive traction systems for wheeled vehicles equipped with either hydraulic or pneumatic braking systems.

2. Prior Art

There has been disclosed heretofore in the prior art a plurality of systems for wheeled vehicles designed to render such systems free-wheeling and of positive traction. See, inter alia, U.S. Pat. Nos. 859,945; 1,130,788; 1,211,661; 1,511,423; 157,997; and 241,460.

Generally speaking, such prior art systems contemplate intricate clutch mechanisms and the like. Such systems are rendered intricate in that they are dependent upon conventional drive shaft assemblies deploying conventional differential gearing.

As a result of so adapting traction systems, rather than modifying the entire system, there is associated therewith frequent failure and great cost.

The present invention, on the other hand, provides a simplified traction system, completely adaptable to all wheeled vehicles, which is of reduced cost and increased efficiency.

SUMMARY OF THE INVENTION

In accordance with the present invention there is provided a traction system for wheeled vehicles which includes:

a. a solid shaft axle having a brake drum mounted on each end thereof; and
b. for each brake drum:
  1. an eccentrically mounted pinned fulcrum journalled on the axle;
  2. a pair of auxiliary clutch shoes, one member of the pair being engageable by the fulcrum to positively drive a wheel associated therewith, the engageable member being determined by the direction of rotation of the wheel.

A ring gear and pinion arrangement is centrally mounted on the axle between the brake drums. The ring gear and pinion is interconnected to the drive shaft of the vehicle for translation of the power into motion.

For a more complete understanding of the present invention reference is made to the following detailed description and accompanying drawing. In the drawing like reference characters refer to like parts throughout the several views in which:

DESCRIPTION OF THE PREFERRED EMBODIMENT

Figure 1:
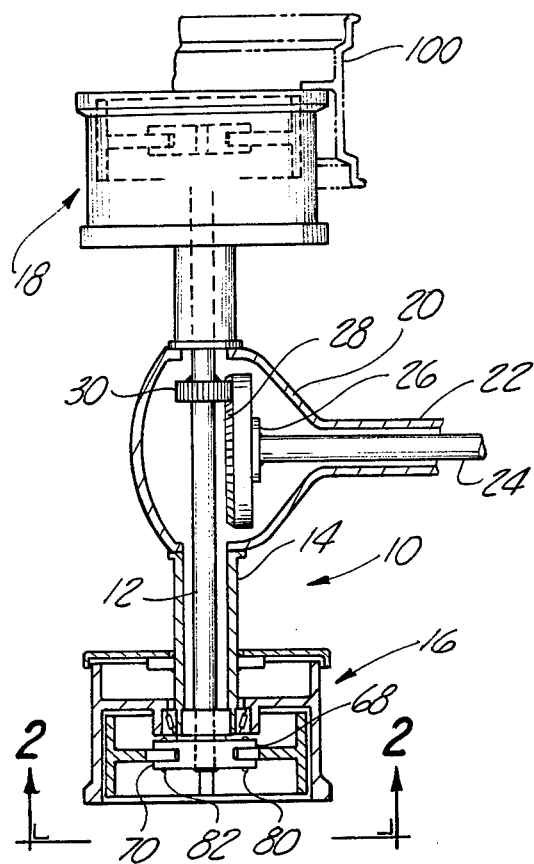
FIG. 1 is a top plan view, partly in section, of a traction system for a wheeled vehicle illustrating the principles of the present invention.

With reference to the drawing, and in accordance with the present invention there is provided a traction system for wheeled vehicles, generally indicated at 10. The system 10 generally includes a solid shaft axle 12 contained within a housing 14. A brake drum 16, 18, respectively, is mounted on each end of the axle 12, in a conventional manner.

As shown in FIG. 1, the housing 14 includes an enlarged central portion 20 with which is integrally formed a housing 22 for a drive shaft 24. The end 26 of the drive shaft 24 carries thereon a pinion 28. The pinion 28 meshes with a ring gear 30 mounted on the axle 12. Thus, rotation of the drive shaft 24 is translated through the ring gear and pinion to the axle 12.

For purposes of brevity the following description will be made with reference to a single brake drum. However, it is to be understood that each brake drum is analogously constructed.

Figure 2:
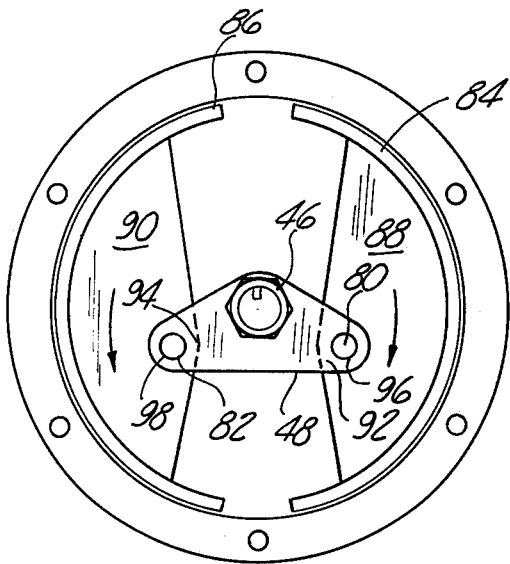
FIG. 2 is a side elevational view taken along the line 2—2 of FIG. 1.
Figure 3:
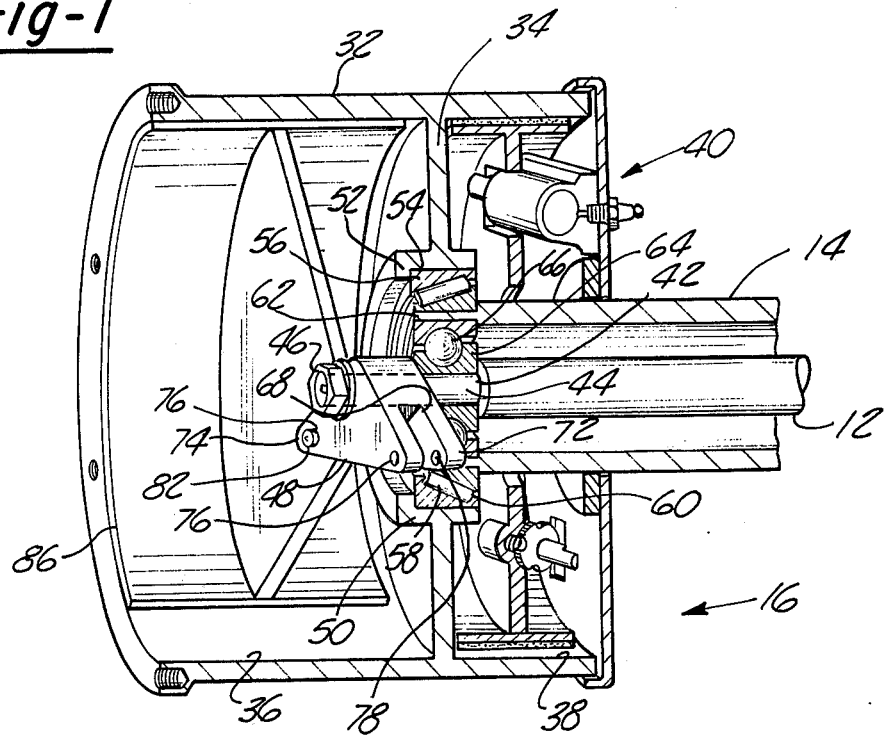
FIG. 3 is a partial cross-sectional and partial perspective view of a wheel drum in accordance with the present invention.

As clearly depicted in FIGS. 2 and 3, each brake housing includes an outer casing 32 having an annular partition 34 integrally formed therewith. The partition 34 divides the casing 32 into a forward section 36 and a rearward section 38. The rearward section 38 houses a conventional braking system, generally indicated at 40.

It is to be understood that in the practice of the present invention the braking system, per se, does not comprise a part of the present invention. Rather, the present traction system can be efficaciously deployed in conjunction with any conventional brake system. Thus, the present traction system can be used with wheeled vehicles equipped with hydraulic brakes, power disc brakes, pneumatic brakes and the like.

Referring again to FIGS. 2 and 3, the solid axle 12 has a reduced diameter section 42 which defines a short axle 44. The short axle section 44 is coaxial with and integrally formed with the solid axle 12. The free end of the short axle section 44 receives a threaded connector 46, such as, a lug nut or the like. As will subsequently be described in further detail, the connector 46 securedly journals a fulcrum 48 onto the short axle 44.

The partition 34, as shown, includes an annular housing 50 which is integrally formed therewith. The housing 40 includes a rim 52. The housing 50 with its rim 52 cooperate to define a seat 54. Press fitted into the seat 54 is an annular bearing 56. A plurality of roller pins 58 are disposed in associated throughbores 60 formed in the bearing 56.

The housing 14, as clearly shown in FIG. 3, also, includes a reduced diameter housing 62 integrally formed therewith and which is concentric with the short axle 44. Press fitted between the short axle 44 and the housing 62 is a second annular bearing 64. The second annular bearing 64 is provided with a plurality of ball bearings 66 circumferentially disposed therearound, in a conventional manner.

As hereinbefore noted, a fulcrum 48 is journalled onto the short axle 44 and is secured thereonto with the threaded connector or connecting means 46. The fulcrum 48 is, preferably, of a triangular configuration. This permits the fulcrum 48 to be eccentrically mounted when journalled onto the short axle 44.

The fulcrum 48 is of a solid construction and is provided with a pair of receiving slots 68, 70 which extend inwardly into the fulcrum from the free apices thereof, 72, 74. Formed through each of the apices 72, 74 are a pair of registering apertures 76, 78. Each of the pair of registering apertures are adapted to receive a locking pin 80, 82 therethrough.

The forward section 36 of the housing 32 has a pair of clutch shoes 84, 86 disposed therein. Each clutch shoe has the same radius as the drum or housing in which it is disposed. However, each one of the pair of shoes has a circumference less than half of the circumference of the housing. This permits each shoe to be free-falling when not engaged.

Each clutch shoe 84, 86 includes an inwardly extending radial wall 88, 90, respectively. The walls 88, 90 are formed integrally with their respective shoes 84, 86 and substantially perpendicular thereto. Each wall terminates in an apex-like section 92, 94. Proximate the terminus of the apex-like sections of the walls, apertures 96, 98 are provided. The apertures provided in the walls are adapted to be in registry with the pairs of apertures provided in the apices of the fulcrum.

It is apparent from the preceding that in practicing the present invention the apex-like section of each wall is inserted into the slots formed in the fulcrum. Then, the respective locking pins are inserted through the registering apertures to securely interlock the clutch shoes to the eccentrically mounted fulcrum.

In accordance with the present invention, the clutch shoes, thusly pinned, are free-falling. This is a result of the circumference and eccentric mounting thereof.

In operation, depending on the direction of rotation of the axle, one of the pair of clutch shoes 84, 86 will be engaged by the fulcrum and will contact the inner surface of its associated casing. Contemporaneously, the other of the pair of clutch shoes will freely fall to the bottom of the casing. In this manner there is imparted to the wheeled vehicle a positive traction.

Moreover, and in accordance with the present invention, the casing 32, which has been described as an integrally formed unit can comprise two separate casings which are connected together by any suitable means, such as, welding or the like.

Furthermore, and as is known to those skilled in the art to which the invention pertains, a conventional wheel drum 100 (FIG. 1) is fitted over the brake drum to complete the drive system.

Having thus described my invention what is claimed is:

1. A traction system for a wheeled vehicle comprising:
   a. an axle having a brake drum rotatably mounted on each end thereof, and
   b. for each brake drum:
      1. a fulcrum eccentrically journalled on the axle, and
      2. a pair of clutch shoes interconnected to the fulcrum, the clutch shoes being free-falling, only one of the pair of clutch shoes being engageable by the fulcrum, at any one time, to drive a wheel associated therewith, the engageable shoe being determined by the direction of rotation of the wheel.

2. The traction system of claim 1 wherein the fulcrum has a triangular configuration, the fulcrum being eccentrically journalled on the axle proximate one apex of the triangle.

3. The traction system of claim 2 wherein each of the pair of clutch shoes is interconnected to the fulcrum at the other apices thereof.

4. The traction system of claim 1 wherein each clutch shoe includes an inwardly directed wall integrally formed therewith, each wall being connected to the fulcrum.

5. The traction system of claim 1 wherein the axle is connected to a drive shaft through a ring gear and pinion assembly.

6. The traction system of claim 1 wherein the axle comprises a solid shaft axle, each end thereof having a short axle integrally formed therewith, the fulcrum being journalled onto the short axle.

7. The traction system of claim 1 wherein the brake drum comprises a casing having an annular partition formed therewith, the partition dividing the drum into a forward section and a rearward section.

8. The traction system of claim 7 wherein the fulcrum is journalled onto the axle in the forward section of the drum.

9. The traction system of claim 7 which further includes (a) a housing integrally formed with the partition and (b) a bearing seated in the housing formed with the partition.

* * * * *